(12) United States Patent
Zhang et al.

(10) Patent No.: US 12,182,191 B2
(45) Date of Patent: Dec. 31, 2024

(54) TEXT CLASSIFICATION METHOD AND APPARATUS, DEVICE, AND COMPUTER-READABLE STORAGE MEDIUM

(71) Applicant: TENCENT TECHNOLOGY (SHENZHEN) COMPANY LIMITED, Shenzhen (CN)

(72) Inventors: Xianli Zhang, Shenzhen (CN); Chong Guan, Shenzhen (CN); Xi Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 129 days.

(21) Appl. No.: 17/968,594

(22) Filed: Oct. 18, 2022

(65) Prior Publication Data

US 2023/0058194 A1 Feb. 23, 2023

Related U.S. Application Data

(63) Continuation of application No. PCT/CN2022/079721, filed on Mar. 8, 2022.

(30) Foreign Application Priority Data

Mar. 12, 2021 (CN) .......................... 202110268045.7

(51) Int. Cl.
 *G06F 16/35* (2019.01)
(52) U.S. Cl.
 CPC .................... *G06F 16/353* (2019.01)
(58) Field of Classification Search
 CPC ....... G06F 16/353; G06F 16/355; G06F 16/35
 See application file for complete search history.

(56) References Cited

U.S. PATENT DOCUMENTS

2020/0210526 A1  7/2020  Leibovitz et al.

FOREIGN PATENT DOCUMENTS

| CN | 110874411 A | 3/2020 |
|---|---|---|
| CN | 111858919 A | 10/2020 |

(Continued)

OTHER PUBLICATIONS

Franz, A Deep Learning Pipeline for Patient Diagnosis Prediction Using Electronic Health Records, pp. 1-10 (Year: 2020).*

(Continued)

*Primary Examiner* — Albert M Phillips, III
(74) *Attorney, Agent, or Firm* — ANOVALAW GROUP PLLC

(57) ABSTRACT

A text classification method includes: obtaining a target text and an associated text corresponding to the target text; performing feature extraction on the target text and the associated text to obtain feature information, the feature information including one or more features; processing the feature information by using an attention mechanism to obtain one or more attention weights respectively corresponding to the one or more features, an attention weight indicating importance of the corresponding feature for the target text and the associated text; and obtaining a class detection result and result interpretation information corresponding to the target text based on the feature information and the one or more attention weights, the class detection result comprising a class distribution probability corresponding to the target text, and the result interpretation information describing impact of the one or more features on the class detection result.

18 Claims, 6 Drawing Sheets

(56) References Cited

FOREIGN PATENT DOCUMENTS

| CN | 112269874 A | 1/2021 |
|----|-------------|--------|
| CN | 112347252 A | 2/2021 |
| CN | 113722474 A | 11/2021 |

OTHER PUBLICATIONS

Navin, Performance Analysis of Text Classification Algorithms using Confusion Matrix. pp. 736-745 (Year: 2007).*
Li, A Novel Neural Network-Based Method for Medical Text Classification, pp. 1-13 (Year: 2019).*
The World Intellectual Property Organization (WIPO) International Search Report for PCT/CN2022/079721 May 23, 2022 7 Pages (including translation).
Fenglong MA, "Dipole: Diagnosis prediction in healthcare via attention-based bidirectional recurrent neural networks", 2017, p. 1903-1911, Proceedings of the 23rd ACM SIGKDD international conference on knowledge discovery and data mining.
Edward Choi, "RETAIN: An Interpretable Predictive Model for Healthcare using Reverse Time Attention Mechanism",2016, p. 3504-3512, Advances in Neural Information Processing Systems.

* cited by examiner

TEXT CLASSIFICATION METHOD AND APPARATUS, DEVICE, AND COMPUTER-READABLE STORAGE MEDIUM

CROSS-REFERENCES TO RELATED APPLICATIONS

This application is a continuation application of PCT Patent Application No. PCT/CN2022/079721, filed on Mar. 8, 2022, which claims priority to Chinese Patent Application No. 202110268045.7 filed on Mar. 12, 2021, the entire contents of both of which are incorporated herein by reference.

FIELD OF THE TECHNOLOGY

The present disclosure relates to the field of artificial intelligence technologies, and relates to, but is not limited to, a text classification method and apparatus, a device, a computer-readable storage medium, and a computer program product.

BACKGROUND OF THE DISCLOSURE

At present, with the development of artificial intelligence, text classification through a computer device in combination with a machine learning model is applied to more scenarios.

In the related art, the technician can perform model training through a large quantity of training samples, and then classify texts by using a trained deep learning model. For example, in a disease prediction scenario in the medical field, when detecting the disease of a target object, the medical staff can input a disease description text of the target object into the deep learning model. The deep learning model performs disease prediction according to the disease description text and outputs pathological information data corresponding to the target object for reference of the medical staff. In another example, in a book classification scenario in the education field, when classifying a subject to which a book belongs, the staff can input a summary description text (preamble, epilogue, or abstract) of the book into the deep learning model. The deep learning model classifies the book according to the summary description text and outputs subject information data corresponding to the book as a subject classification result. Certainly, the text classification based on the deep learning model can also be applied to multiple other scenarios. Examples are not listed one by one herein.

However, in the related art described above, the reliability of the text classification result outputted by the deep learning model is not sufficiently high.

SUMMARY

Embodiments of the present disclosure provide a text classification method and apparatus, a device, a computer-readable storage medium, and a computer program product, which can improve the reliability of a class detection result.

An embodiment of the present disclosure provides a text classification method, including: obtaining a target text and an associated text corresponding to the target text; performing feature extraction on the target text and the associated text to obtain feature information, the feature information including one or more features; processing the feature information by using an attention mechanism to obtain one or more attention weights respectively corresponding to the one or more features, an attention weight indicating importance of the corresponding feature for the target text and the associated text; and obtaining a class detection result and result interpretation information corresponding to the target text based on the feature information and the one or more attention weights, the class detection result comprising a class distribution probability corresponding to the target text, and the result interpretation information describing impact of the one or more features on the class detection result.

An embodiment of the present disclosure provides a text classification model training method, including: obtaining multiple sample texts and class information corresponding to the sample texts; separately extracting sample feature information from the sample texts; and training the text classification model by using the sample feature information and the class information, an attention mechanism being introduced into the text classification model, the attention mechanism being used for determining importance of sample features in the sample feature information for the sample texts, and the importance being used for determining impact of the sample features on a model output result.

An embodiment of the present disclosure provides a text classification apparatus, including: a text obtaining module, configured to obtain a target text and an associated text corresponding to the target text; a feature extraction module, configured to perform feature extraction on the target text and the associated text to obtain feature information, the feature information including one or more features; a weight obtaining module, configured to process the feature information by using an attention mechanism to obtain one or more attention weights respectively corresponding to the one or more features, an attention weight indicating importance of the corresponding feature for the target text and the associated text; and a result obtaining module, configured to obtain a class detection result and result interpretation information corresponding to the target text based on the feature information and the one or more attention weights, the class detection result comprising a class distribution probability corresponding to the target text, and the result interpretation information describing impact of the one or more features on the class detection result.

An embodiment of the present disclosure provides a text classification model training apparatus, including: a sample obtaining module, configured to obtain multiple sample texts and class information corresponding to the sample texts; a feature obtaining module, configured to separately extract sample feature information from the sample texts; and a model training module, configured to train the text classification model by using the sample feature information and the class information, an attention mechanism being introduced into the text classification model, the attention mechanism being used for determining importance of sample features in the sample feature information for the sample texts, and the importance being used for determining impact of the sample features on a model output result.

An embodiment of the present disclosure provides a computer device, including a processor and a memory, the memory storing at least one instruction, at least one program, a code set, or an instruction set, the at least one instruction, the at least one program, the code set, or the instruction set being loaded and executed by the processor to implement the foregoing text classification method or the foregoing text classification model training method.

An embodiment of the present disclosure provides a non-transitory computer-readable storage medium, storing at least one instruction, at least one program, a code set, or an instruction set, the at least one instruction, the at least one program, the code set, or the instruction set being loaded and executed by a processor to implement the foregoing text classification method or the foregoing text classification model training method.

The technical solutions provided in the embodiments of the present disclosure can bring the following beneficial effects:

The feature information is processed through the attention mechanism to determine the attention weight used for indicating the importance of each feature for the text, and the class detection result and the result interpretation information are obtained according to the feature information and the attention weight. On one hand, the class detection result includes the class distribution probability, so that the class detection result has diversity, thereby avoiding the output of only one class. On the other hand, the result interpretation information is used for describing the impact on each feature for the class detection result, which makes the class detection result explainable, thereby improving the reliability of the class detection result, and providing an intuitive basis for determining the class detection result based on the result interpretation information.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
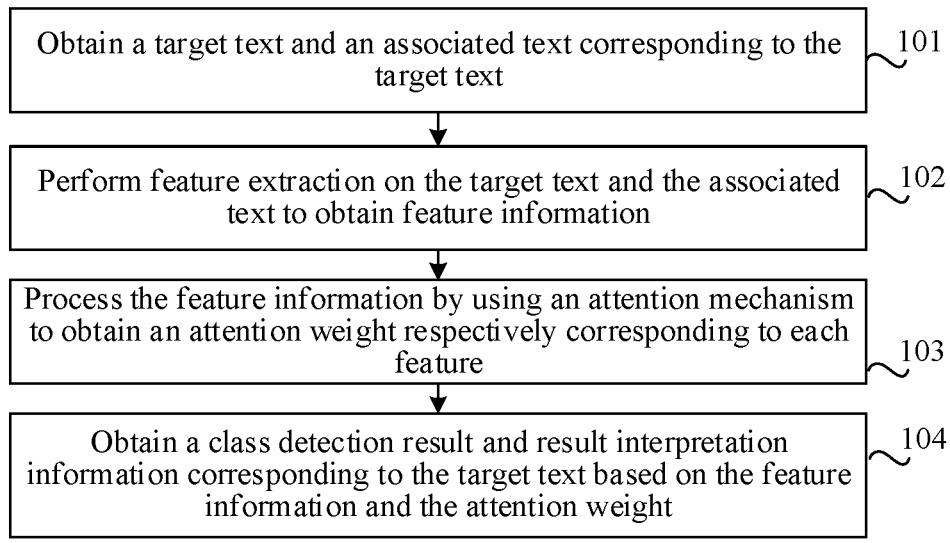
FIG. 1 is a flowchart of a text classification method according to an embodiment of the present disclosure.

To make the objectives, technical solutions, and advantages of the present disclosure clearer, the following describes the implementations of the present disclosure in detail with reference to the accompanying drawings.

Artificial intelligence (AI) is a theory, method, technology, and application system that uses a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study design principles and implementation methods of various intelligent machines, so that the machines have the functions of perception, reasoning, and decision-making.

AI technology is a comprehensive discipline, covering a wide range of fields including both a hardware-level technology and a software-level technology. Basic AI technologies generally include technologies such as sensors, dedicated AI chips, cloud computing, distributed storage, big data processing technologies, operating/interaction systems, and mechatronics. AI software technologies mainly include fields such as a computer vision technology, a speech processing technology, a natural language processing technology, machine learning/deep learning, and the like.

Natural language processing (NLP) is an important direction in the fields of science and AI. NLP studies various theories and methods that enable effective communication between human and computers through natural languages. NLP is a science that integrates linguistics, computer science and mathematics. Therefore, studies in this field relate to natural languages, that is, languages used by people in daily life, and NLP is closely related to linguistic studies. NLP technologies usually include text processing, semantic understanding, machine translation, robot question answering, knowledge graphs and other technologies.

Machine learning (ML) is a multi-field interdiscipline, and relates to multiple disciplines such as the probability theory, statistics, the approximation theory, convex analysis, and the algorithm complexity theory. ML specializes in studying how a computer simulates or implements a human learning behavior to obtain new knowledge or skills, and reorganize an existing knowledge structure, so as to keep improving its performance. The ML is the core of the AI, is a basic way to make the computer intelligent, and is applied to various fields of AI. The ML and deep learning generally comprise technologies such as an artificial neural network, a belief network, reinforcement learning, transfer learning, inductive learning, and learning from demonstrations.

With the research and progress of the AI technology, the AI technology is studied and applied in multiple fields such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied to more fields, and play an increasingly important role.

The solutions provided in the embodiments of the present disclosure involve technologies such as ML of AI, and a text classification model is trained by using sample feature information extracted from multiple sample texts and class information corresponding to the sample texts. In some embodiments, a single sample text includes a first text and a second text, and the second text is an associated text of the first text. For example, if the first text is a current disease text of the user, the second text is a historical medical record text of the user; if the first text is a current submitted article of the user, the second text is a historical submitted text of the user; and if the first text is a currently browsed web page, the second text is one or more historical browsed web pages that the user has recently browsed. During obtaining of the sample feature information, feature extraction is performed on the first text and the second text to obtain sample feature information corresponding to the first text. Then, after the training of the text classification model is completed, when a target text is obtained, feature information corresponding to the target text is extracted based on the target text and an associated text corresponding to the target text, and the feature information is processed by using the text classification model to obtain a class detection result and result interpretation information corresponding to the target text. The class detection result includes a class distribution probability corresponding to the target text, and the result interpretation information is used for describing impact of each feature in the feature information for the class detection result. In addition, in the embodiments of the present disclosure, a spatial attention mechanism and a sparse access level attention mechanism are introduced into the text classification model. The spatial attention mechanism is used for determining importance of a single feature, the sparse access level attention mechanism is used for determining importance of a feature set in which the feature is located, and the feature set includes features from the same text. An essence of the spatial attention mechanism is to locate a target and make some transformation or obtain the weight. A spatial attention weight of each feature in the feature information can be determined through the spatial attention mechanism, so as to determine the feature that needs attention from the feature information. During determining of the spatial attention weight of the feature based on the spatial attention mechanism, an embedding vector of each feature in the feature information is first obtained to obtain an embedding matrix, then the embedding matrix is mapped to a hidden state through an encoder to obtain a hidden state matrix of the feature, and finally the spatial attention weight of each feature is determined through a model parameter of a spatial attention model and the hidden state matrix of the feature. The importance of the feature set in which the feature is located is determined based on the sparse access level attention mechanism, that is, a sparse access level attention weight of the feature set in which the feature is located is determined. During implementation, an output matrix of each feature can be determined based on the hidden state matrix of the feature and a model parameter of a sparse access level attention model, and then an activation function softmax ( ), a sparse probability activation function sparemax ( ), and the output matrix of each feature can be used to determine the importance of the feature set in which the feature is located.

The text classification model provided in the embodiments of the present disclosure can be widely applied to various fields. For example, the text classification model can be applied to at least the following fields:

(1) In a disease prediction scenario in the medical field, the medical staff determines a current disease description text based on observation of the disease obtained from a target object, and inputs identification information of the target object and the disease description text into the computer device. For example, after obtaining the disease description text, the computer device obtains a historical medical record text of the target object based on the identification information of the target object, and performs feature extraction on the current disease description text and the historical medical record text to obtain feature information of the target object. The feature information includes at least one feature (such as the disease name or the disease medication). Then, the computer device processes the feature information of the target object by using the text classification model to obtain a disease distribution probability and result interpretation information corresponding to the target object outputted by the text classification model. The disease distribution probability indicates possible diseases of the target object, and appearance probability values of the diseases; and the result interpretation information is used for describing a basis of obtaining the disease distribution probability. For example, the result interpretation information includes impact of each feature in the process of determining the disease distribution probability. For example, the medical staff can quickly determine the disease corresponding to the user according to the disease distribution probability and the result interpretation information corresponding to the target object, and take corresponding measures according to the disease to reduce the labor burden of the medical staff.

(2) In a book classification scenario in the education field, the staff uses a summary description text (preamble, epilogue, or abstract) of a to-be-classified book as a target text, and inputs identification information of the to-be-classified book (the author of the to-be-classified book) and the target text into the computer device. The computer device obtains an associated book (a book having the same author as the to-be-classified book) based on the identification information of the to-be-classified book, and performs feature extraction on the summary description text of the to-be-classified book and a summary description text of the associated book to determine feature information of the to-be-classified book. The feature information includes at least one feature (keyword). Then, the feature information of the to-be-classified book is processed by using the text classification model to obtain a class distribution probability and result interpretation information of the to-be-classified book. The class distribution probability indicates subjects to which the to-be-classified book may belong and probability values of the subjects; and the result interpretation information is used for describing a basis of obtaining the class distribution probability. For example, the result interpretation information includes impact of each feature in the process of determining the class distribution probability. During implementation, the subject to which the book belongs can be quickly determined according to the class distribution probability and the result interpretation information of the to-be-classified book, and the book is placed in a suitable position, so as to facilitate the subsequent search and learning for a student. The quick classification of the book laterally ensures the integrity of the information found by the student.

(3) In a user intention determination scenario in the AI field, after detecting a to-be-served user, an intelligent robot talks with the to-be-served user, obtains words of the user to generate a target text, and determines whether the to-be-served user is an old user according to user identity information of the to-be-served user. For example, the robot may initiate an identity recognition system to determine the user identity so as to obtain the user identity information, or the to-be-served user may positively provide the user identity. If the to-be-served user is an old user, historical service information of the to-be-served user is obtained based on the user identity information to generate an associated text, and feature extraction is performed on the target text and the associated text to obtain feature information of the to-be-served user. The feature information includes at least one feature (keyword). Then, the feature information of the to-be-served user is processed by using the text classification model to obtain an intention distribution probability and result interpretation information of the to-be-served user.

The intention distribution probability indicates a possible intention of the to-be-served user and a probability value corresponding to the intention; and the result interpretation information is used for describing a basis for obtaining the intention distribution probability. For example, the result interpretation information includes impact of each feature in the process of determining the intention distribution probability. Then, the intelligent robot determines a user demand of the to-be-serviced user according to the intention distribution probability and guides the to-be-served user to a suitable position.

Certainly, the text classification model in the embodiments of the present disclosure may also be applied to other fields. Examples are not listed one by one herein.

For ease of description, in the following method embodiments, the description is provided by merely using a computer device as the execution body of the steps. The computer device may be any electronic device with computing and storage capabilities. For example, the computer device may be a server. The server may be an independent physical server, or may be a server cluster or a distributed system formed by multiple physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform. In another example, the computer device may also be a terminal. The terminal may be a smartphone, a tablet computer, a notebook computer, a desktop computer, a smart speaker, a smartwatch, a smart in-vehicle device, or the like, but is not limited thereto. The terminal and the server may be directly or indirectly connected in a wired or wireless communication manner. This is not limited in the embodiments of the present disclosure. In the embodiments of the present disclosure, the execution body of steps may be the same computer device, or the steps may be performed by interaction and cooperation between multiple different computer devices. This is not limited herein. In the embodiments of the present disclosure, the execution bodies of the following text classification method and the following text classification model training method may be the same computer device or different computer devices. This is not limited in the embodiments of the present disclosure.

FIG. 1 is a flowchart of a text classification method according to an embodiment of the present disclosure. The method may include the following steps:

Step 101. Obtain a target text and an associated text corresponding to the target text.

The target text is a text of an unknown class. In this embodiment of the present disclosure, the computer device obtains the target text before classifying the target text, and obtains the associated text corresponding to the target text. The associated text refers to a text having an association relationship with the target text. In some embodiments, the association relationship includes, but is not limited to, at least one of the following: having the same author, for the same object, having the same operator, having the same attribute information, and the like. This is not limited in the embodiments of the present disclosure. The attribute information is text browsing duration, text browsing moment, and text browsing times.

For example, using the association relationship being for the same object as an example, the computer device determines a target object (a person, an animal, an object, or weather) described by the target text after obtaining the target text, and then obtains another text for the target object as the associated text of the target text based on the target object.

In one embodiment, the target text is actively provided to the computer device by a user. In some embodiments, the user determines to-be-detected information according to an actual situation, and inputs text content corresponding to the to-be-detected information to the computer device or an associated device of the computer device. The computer device obtains the text content as the target text. The text content can be inputted by text input, voice input, image input, gesture input, or the like. This is not limited in the embodiments of the present disclosure.

In another embodiment, the target text is actively obtained by the computer device. In some embodiments, the computer device can obtain the target text from a network environment or a specific device at a specified time interval. The time interval may be 1 second (s), 1 minute (min), 1 hour (h), 1 day, 1 month, or the like. This is not limited in the embodiments of the present disclosure.

Certainly, the computer device can flexibly set and adjust the obtaining manner of the target text according to the actual situation. For example, if the target text is a to-be-detected disease, the computer device can obtain the target text in real time, and determine the disease of the user based on the target text to ensure timeliness of the disease detection; and if the target text is a to-be-classified article, the computer device obtains the target text according to a specified time interval, determines an article class based on the target text, and then stores the article to a suitable position according to the article class. While the target text is classified, the computer device runs according to a specified time period, so as to avoid excessive load of the computer device at a specified moment.

The target text may be a directly inputted text or an indirectly inputted text.

In one embodiment, the target text is a text directly inputted by the user. After obtaining input content of the user, the computer device directly uses the input content as the target text. In this case, the input content of the user is the text content. In some embodiments, the text content can be inputted by text input, voice input, image input, gesture input, or the like. This is not limited in the embodiments of the present disclosure.

In another embodiment, the target text is a text indirectly inputted by the user. After obtaining input content of the user, the computer device extracts the input content and uses the extracted text as the target text. In this case, the input content of the user may be voice content, image content, text content, or the like. This is not limited in the embodiments of the present disclosure. For example, in order to simplify an operation of the user, the user can directly input an image, and then the computer device extracts target text according to the image. In this case, the target text may be text information in the image.

Step 102. Perform feature extraction on the target text and the associated text to obtain feature information.

In this embodiment of the present disclosure, after obtaining the target text and the associated text, the computer performs the feature extraction on the target text and the associated text to obtain the feature information. The feature information includes at least one keyword extracted from the target text and the associated text. One keyword may represent one feature. For example, if the target text is disease description information, keywords included in the feature information include a disease name, a disease medication, and the like. During implementation, the keywords such as the disease name and the disease medication can be determined as different features of the target text.

In some embodiments, when extracting the feature information, the computer device filters out noise information such as a punctuation mark or an emoticon in the texts (the target text and the associated text), then performs word segmentation on the texts with no noise, and extracts entities as keywords to generate the feature information.

Step 103. Process the feature information by using an attention mechanism to obtain an attention weight respectively corresponding to each feature.

In this embodiment of the present disclosure, after obtaining the feature information, the computer device processes the feature information by using the attention mechanism to obtain the attention weight respectively corresponding to each feature. The attention weight indicates importance of the feature for the target text and the associated text. In some embodiments, the computer device can determine the importance of the feature for the target text and the associated text according to an appearance frequency of the feature in at least one of the target text or the associated text. Certainly, the computer device can also determine the importance of the feature for the target text and the associated text according to association relationships between the features. For example, the more features associated with a certain feature, the higher the importance of the feature; on the contrary, the fewer features associated with a certain feature, the lower the importance of the feature. That is, the number of features associated with one feature is positively correlated with the importance of the feature.

In this embodiment of the present disclosure, the attention mechanism includes a spatial attention mechanism and a sparse access level attention mechanism. The spatial attention mechanism is used for measuring importance of a single feature, the sparse access level attention mechanism is used for measuring importance of a feature set, and the feature set includes features from the same text.

In some embodiments, step 103 includes the following steps: 1. Process each feature in the feature information by using the spatial attention mechanism to obtain a spatial attention weight respectively corresponding to each feature. 2. Combine and divide the features from the same text based on sources of each feature to obtain multiple groups of feature sets, where different feature sets include features from different texts. 3. Process the multiple groups of feature sets by using the sparse access level attention mechanism to obtain a sparse access level attention weight respectively corresponding to each feature.

In this embodiment of the present disclosure, the attention weight includes a spatial attention weight and a sparse access level attention weight.

In some embodiments, when obtaining the spatial attention weight, the computer device processes each feature in the feature information by using the spatial attention mechanism to obtain the spatial attention weight respectively corresponding to each feature. The spatial attention weight indicates importance of a single feature in the feature information.

In some embodiments, when obtaining the sparse access level attention weight, the computer device combines and divides features from the same text based on sources of each feature to obtain multiple groups of feature sets. Different feature sets include features from different texts, and the same feature set includes features from the same text. The computer device processes the multiple groups of feature sets by using the sparse access level attention mechanism to obtain a sparse access level attention weight respectively corresponding to each feature. The sparse access level attention weight indicates importance of the feature set.

Certainly, in actual application, the computer device can determine multiple groups of feature sets when obtaining the feature information. For example, the computer device uses a feature vector to represent the feature set after obtaining each feature. One feature vector corresponds to one feature set, multiple feature sets form a feature matrix, and the feature matrix is used for representing the feature information. In this case, the computer device can process the feature information by directly using the sparse access level attention mechanism without combining and dividing the features.

Step 104. Obtain a class detection result and result interpretation information corresponding to the target text based on the feature information and the attention weight.

In this embodiment of the present disclosure, after obtaining the feature information and the attention weight, the computer device obtains the class detection result and the result interpretation information corresponding to the target text based on the feature information and the attention weight. The class detection result includes a class distribution probability corresponding to the target text, and the result interpretation information is used for describing impact of each feature for the class detection result.

The attention mechanism includes a spatial attention mechanism and a sparse access level attention mechanism. The spatial attention mechanism indicates importance of a single feature, the sparse access level attention mechanism indicates importance of a feature set, and the feature set includes features from the same text. In some embodiments, the "obtaining result interpretation information corresponding to the target text based on the feature information and the attention weight" in step 104 may be implemented in the foregoing steps: obtaining a spatial attention weight and a sparse access level attention weight corresponding to the feature; determining a final attention weight corresponding to the feature according to the spatial attention weight and the sparse access level attention weight; determining a contribution coefficient corresponding to the feature based on the final attention weight and an embedding vector corresponding to the feature; and determining the contribution coefficient respectively corresponding to each feature is as result interpretation information corresponding to the target text.

In this embodiment of the present disclosure, when obtaining the result interpretation information, the computer device traverses each feature in the feature information to obtain the contribution coefficient respectively corresponding to each feature, and then generates result interpretation information. The result interpretation information includes the contribution coefficient respectively corresponding to each feature.

Using a single feature as an example, when obtaining the contribution coefficient corresponding to the feature, the computer device obtains a spatial attention weight and a sparse access level attention weight corresponding to the feature. The spatial attention weight indicates importance of the single feature, and the sparse access level attention weight indicates importance of a feature set in which the feature is located. Then, the computer device determines a final attention weight corresponding to the feature according to the spatial attention weight and the sparse access level attention weight; and determine a contribution coefficient corresponding to the feature based on the final attention weight and an embedding vector corresponding to the feature.

In some embodiments, after obtaining the class detection result and the result interpretation information, the computer device can display the class detection result and the result interpretation information to the user, and the user can determine possible classes of the target text and probability values respectively corresponding to the classes of the target text based on the class detection result. In addition, the user can determine a basis for obtaining the class detection result based on the result interpretation information.

In summary, according to the technical solution provided in this embodiment of the present disclosure, the feature information is processed through the attention mechanism to determine the attention weight used for indicating the importance of each feature for the text, and the class detection result and the result interpretation information are obtained according to the feature information and the attention weight. On one hand, the class detection result includes the class distribution probability, so that the class detection result has diversity, thereby avoiding the output of only one class. On the other hand, the result interpretation information is used for describing the impact on each feature for the class detection result, which makes the class detection result explainable, thereby improving the reliability of the class detection result. The user can determine the basis for obtaining the class detection result based on the result interpretation information, so that the user can more intuitively understand the class detection result.

In addition, when classifying the target text, the accuracy of the class detection result is ensured in combination with the associated text. Moreover, for the single feature, the importance of the single feature is measured by using the spatial attention mechanism, the importance of the feature set is measured by using the sparse access level attention mechanism, and the feature set includes the features from the same text. Subsequently, the contribution coefficient of the feature is determined by using the spatial attention weight and the sparse access level attention weight to ensure the accuracy of contribution evaluation for the feature, so as to make the result interpretation information for the class detection result more reliable.

In this embodiment of the present disclosure, the method can also be implemented through the text classification model, that is, the class detection result and the result interpretation information are obtained by using the text classification model through the feature information. The text classification model processes the feature information for multiple times by using different model parameters. In some embodiments, the class detection result includes n groups of class detection sub-results, the result interpretation information includes n pieces of result interpretation sub-information corresponding to the n groups of class detection sub-results, and n is a positive integer. The class detection sub-result and the result interpretation sub-information are in a one-to-one correspondence, that is, the text classification model can obtain the class detection sub-results and the result interpretation sub-information after processing the feature information by using a certain set of model parameters.

In this embodiment of the present disclosure, after obtaining the class detection result and the result interpretation information, the computer device performs averaging the class detection sub-results in the class detection result and performs the averaging on the result interpretation sub-information in the result interpretation information.

In some embodiments, the processing steps for the class detection result are as follows: separately obtaining probability values corresponding to a target class from the n groups of class detection sub-results, performing averaging on the probability values of the target class to obtain a final probability value corresponding to the target class; and generating a final class detection result corresponding to the target text, where the final class detection result includes a final probability value respectively corresponding to each class.

The class detection sub-result includes a class distribution probability corresponding to the target text. Different class detection results are obtained after the text classification model processes the target text by using different model parameters, that is, class distribution probabilities included in the different class detection results are different. In this embodiment of the present disclosure, after obtaining the n groups of class detection sub-results, the computer device performs the averaging on the class distribution probabilities in the n groups of class detection sub-results.

In some embodiments, after obtaining the n groups of class detection sub-results, the computer device separately obtains the probability values corresponding to the target class from the n groups of class detection sub-results. The target class may be any class in any detection result for the target text, and the computer device performs the averaging on the probability values of the target class to obtain a final probability value corresponding to the target class, and then generates a final class detection result corresponding to the target text. The final class detection result includes a final probability value respectively corresponding to each class.

In some embodiments, the processing steps for the result interpretation information are as follows: separately obtaining contribution coefficients corresponding to a target feature from the n pieces of result interpretation sub-information; performing the averaging on the contribution coefficients corresponding to the target feature to obtain a final contribution coefficient corresponding to the target feature; and generating a final result interpretation information corresponding to the target text, where the final result interpretation information includes a final contribution coefficient respectively corresponding to each feature.

The result interpretation sub-information includes the contribution coefficient respectively corresponding to each feature. Different result interpretation sub-information is obtained after the text classification model processes the target text by using different model parameters, that is, contribution coefficients respectively corresponding to the features included in the different result interpretation sub-information are different. In this embodiment of the present disclosure, after obtaining the n groups of result interpretation sub-information, the computer device performs the averaging on the contribution coefficients in the n groups of result interpretation sub-information.

In some embodiments, after obtaining the n pieces of result interpretation sub-information, the computer device separately obtains the contribution coefficients corresponding to the target class from the n pieces of result interpretation sub-information. The target feature may be any feature, and then the computer device performs the averaging on the contribution coefficients of the target feature to obtain the final contribution coefficient corresponding to the target feature, and then generates the final result interpretation information corresponding to the target text. The result interpretation information includes the final contribution coefficient respectively corresponding to each feature.

In this embodiment of the present disclosure, after obtaining the final class detection result, the computer device can determine confidence of the text classification model for the target text according to the final class detection result in the following steps: obtaining a measurement parameter of the final class detection result based on the final probability value respectively corresponding to each class, where the measurement parameter is used for measuring confusion of the final class detection result; determining confidence of the text classification model for the target text according to the measurement parameter; determining the final class detection result as an accurate detection result in response to the confidence meeting a condition; and generating prompt information in response to the confidence not meeting the condition, where the prompt information is used for reminding to perform manual analysis on the target text.

The measurement parameter may be a variance or entropy of the class distribution probability in the final class detection result. The measurement parameter is positively correlated with the confusion, that is, the larger the measurement parameter, the more confused the final class detection result. In this embodiment of the present disclosure, after obtaining the final class detection result, the computer device obtains the measurement parameter of the final detection result based on the final probability value respectively corresponding to each feature in the final class detection result and determines the confidence of the text classification model for the target text according to the measurement parameter. The confidence is proportional to reliability of the text classification model for the target text, that is, the higher the confidence, the more reliable the classification of the text classification model for the target text.

The condition refers to a determining condition for the confidence. For example, the condition is that the confidence is greater than a threshold. In this embodiment of the present disclosure, the computer device detects the confidence after obtaining the confidence. If the confidence meets the condition, it is determined that the reliability of the text classification model for the target text meets the requirement, and the final class detection result is determined as an accurate detection result; and if the confidence does not meet the condition, it is determined that the reliability of the text classification model for the target text does not meet the requirement, and then prompt information is generated to remind to perform manual analysis on the target text. Certainly, in actual application, the staff can adjust the condition. For example, when uncertainty (e.g., epistemic uncertainty) is determined based on the measurement parameter, the condition is set to that the uncertainty is less than a target value. During implementation, predicted uncertainty can be quantified by using the entropy of the mean of the obtained class distribution probabilities according to formula (1-1):

$$Epi_{\hat{o}} = -\sum_{i=1}^{2} p_{i} log(p_{i}). \qquad (1-1)$$

$p_i$ is the mean of the class distribution probabilities.

In this case, the cognitive uncertainty can be quantified. Compared with other models in the related art, the confidence of the text classification model provided in the embodiments of the present disclosure can be determined, that is, whether the text classification model is confident about the current prediction result can be determined, thereby improving the reliability of the text classification model.

In some embodiments, the different model parameters are obtained according to multiple random sampling. For example, during processing of a to-be-detected model, before each processing of the target text, a group of model parameters are obtained by using Monte Carlo sampling, and then the target text is processed based on the model parameters. Certainly, in actual application, the obtaining manner of multiple groups of different model parameters can be flexibly set and adjusted according to the actual situation. This is not limited in the embodiments of the present disclosure.

A text classification model training method provided in the embodiments of the present disclosure is described below.

Figure 2:
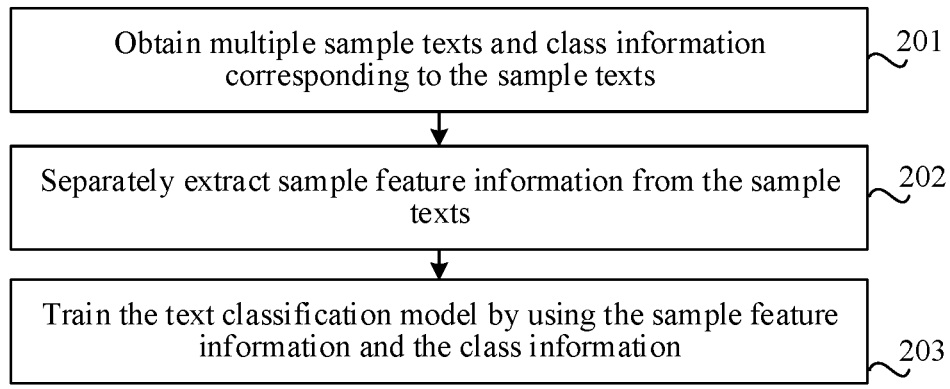
FIG. 2 is a flowchart of a text classification model training method according to an embodiment of the present disclosure.

FIG. 2 is a flowchart of a text classification model training method according to an embodiment of the present disclosure. The method may include the following steps:

Step 201. Obtain multiple sample texts and class information corresponding to the sample texts.

The sample text refers to a text of a known class. In this embodiment of the present disclosure, before training a text classification model, the computer device obtains multiple sample texts and class information corresponding to the sample texts. A single sample text includes a first text and a second text, and the second text is an associated text of the first text. For example, if the first text is a current disease text of the user, the second text is a historical medical record text of the user; if the first text is a current submitted article of the user, the second text is a historical submitted text of the user; and if the first text is a currently browsed web page, the second text is a limited number of historical browsed web pages recently browsed by the user.

Step 202. Separately extract sample feature information from the sample texts.

In this embodiment of the present disclosure, after obtaining the sample texts, the computer device separately extracts sample feature information from the sample texts. The sample feature information includes at least one sample feature, and the sample feature refers to a keyword extracted according to text record content. In some embodiments, when extracting the sample feature information, the computer device filters out noise information such as a punctuation mark or an emoticon in the sample texts (the target text and the associated text), performs word segmentation on the sample texts with no noise, and extracts entities as keywords to generate the sample feature information.

Step 203. Train the text classification model by using the sample feature information and the class information.

In this embodiment of the present disclosure, after obtaining the sample feature information, the computer device trains the text classification model by using the sample feature information and the class information. In some embodiments, the computer device uses the class information as label information of the sample feature information based on a correspondence between the sample text and the sample feature information to generate a training sample, and trains the text classification model by using the training sample.

In some embodiments, during training the text classification model, the computer device processes the sample feature information for multiple times of by using multiple groups of model parameters to obtain multiple groups of model output results, and determines a loss function value of the text classification model based on the multiple groups of model output results and the class information. A loss function indicates accuracy of an output result of the text classification model. Then, the computer device adjusts a parameter of the text classification model based on the loss function value until the loss function converges.

For example, the loss function of the text classification model may be represented by formula (1-2):

$$L_{esm} = \log \frac{1}{T_{mc}} \sum_{i=1}^{N} \sum_{c}^{C} \sum_{t=1}^{T_{mc}} \exp\left(\hat{y}_{i,c,t} - \log \sum_{j=1}^{l} \hat{y}_{i,c,t,j}\right) + \lambda \sum_{k=1}^{L} \left(\|W_k\|_2^2 + \|b_k\|_2^2\right). \quad (1\text{-}2)$$

Tmc refers to the number of times that the text classification model processes the sample feature information, and each time a different model parameter is used to process the sample feature information. N refers to the number of pieces of the sample feature information, C refers to the sample feature information, c refers to the features in the sample feature information, $\hat{y}_{i,c,t}$ refers to class information corresponding to an $i^{th}$ piece of sample feature information, $\hat{y}_{i,c,t,j}$ refers to a $j^{th}$ output result of the text classification model, l refers to the number of classes outputted by the text classification model, $\lambda$ refers to a balance parameter of the text classification model, L refers to the number of network layers of the text classification model, and $W_k$ and $b_k$ refer to model parameters corresponding to a $k^{th}$ layer of network.

In this embodiment of the present disclosure, an attention mechanism is introduced into the text classification model, the attention mechanism is used for determining importance of sample features in the sample feature information for the sample texts, and the importance is used for determining impact of the sample features on a model output result. In some embodiments, the attention mechanism includes a spatial attention mechanism and a sparse access level attention mechanism. In actual application, the spatial attention mechanism is used for measuring importance of a single feature, the sparse access level attention mechanism is used for measuring importance of a feature set, and the feature set includes features from the same text.

In this embodiment of the present disclosure, a validation text is further obtained. After training the network by using the sample text, an evaluation indicator of the trained model is validated by using the validation text, which is iterated according to the process. The result on each round of a validation set is observed. If results on the validation set are not improved for five consecutive rounds, model parameters of the best result on the previous validation set are remained.

In summary, according to the technical solution provided in this embodiment of the present disclosure, the text classification model is obtained by training through the sample feature information and the class information, and the attention mechanism is introduced into the text classification model. In the model application process, the feature information is processed by using the attention mechanism to determine the attention weight used for indicating the importance of each feature for the text, so that while outputting the result, the model can output a basis for obtaining the result, so that the user can more intuitively understand the model output result.

Figure 3:
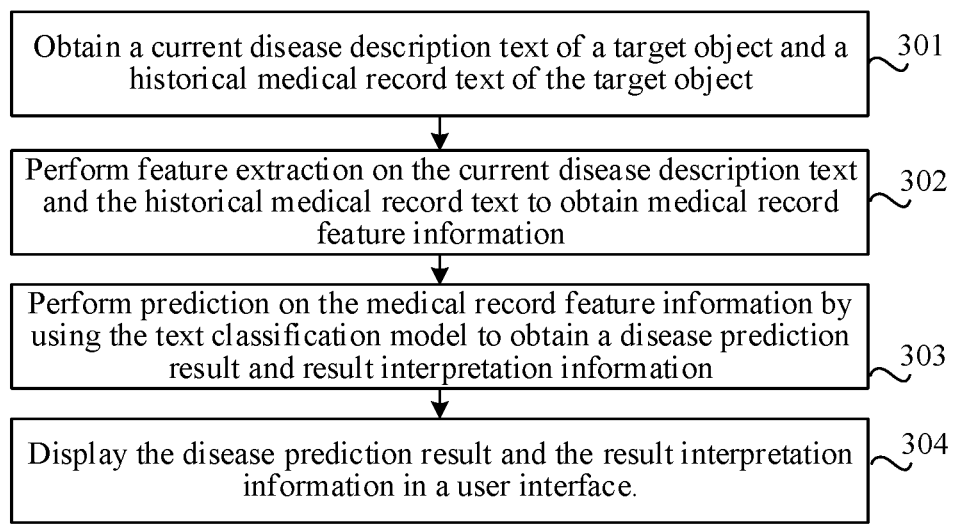
FIG. 3 is a schematic flowchart of another text classification method according to an embodiment of the present disclosure.

Referring to FIG. 3, a text classification method provided in the embodiments of the present disclosure is described below by using the medical field as an example. In the medical field, the text classification model can be used for disease prediction.

Step 301. Obtain a current disease description text of a target object and a historical medical record text of the target object.

The target object is any user on which disease prediction is performed. The current disease description text indicates a current disease of the target object. In some embodiments, the current disease description text is text information determined by the medical staff according to an actual situation of the target object and inputted into the computer device.

In this embodiment of the present disclosure, before performing the disease prediction on the target object, the current disease description text and the historical medical record text of the target object are obtained. In some embodiments, after determining the disease prediction for the target object, the computer device obtains the historical medical record text of the target object from a medical record storage library based on identification information of the target object. The identification information indicates a unique target object. For example, the identification information is an ID card number, a unique number assigned by a hospital, a mobile phone number, or the like.

Certainly, in actual application, the historical medical record text can also be obtained by the medical staff based on a summary of paper documents and inputted into the computer device.

Step 302. Perform feature extraction on the current medical record description text and the historical medical record text to obtain medical record feature information.

In this embodiment of the present disclosure, after obtaining the current medical record description text and the historical medical record text, the computer device performs feature extraction on the current medical record description text and the historical medical record text to obtain the medical record feature information. During implementation, the medical record feature information of the current medical record description text and the historical medical record text can be analyzed by using a natural language processing technique. The medical record feature information may be a structured discrete feature, and the medical record feature information includes a medical record feature. The medical record feature refers to a keyword extracted from record content of the current medical record description text or the historical medical record text, such as a disease name or a disease medication.

Figure 4:
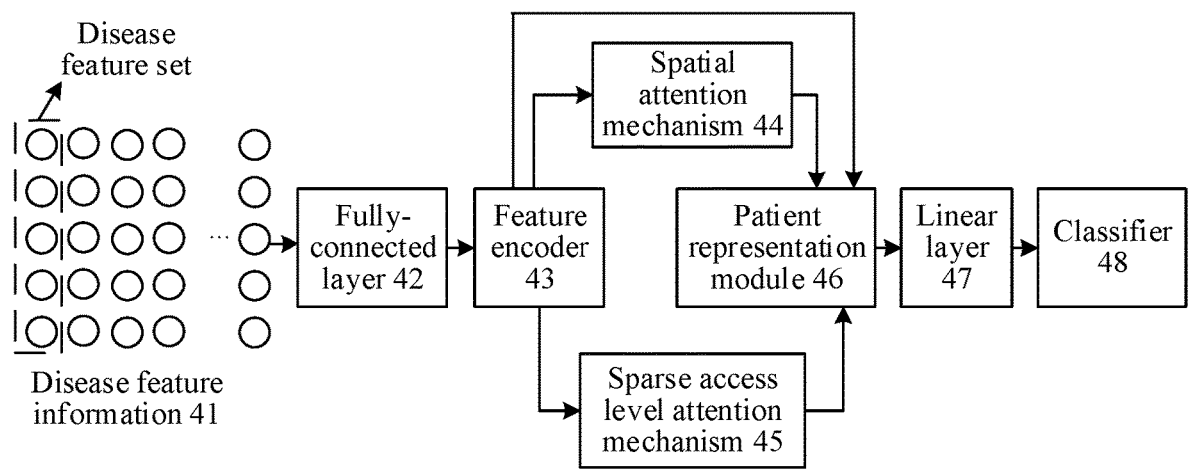
FIG. 4 is a schematic diagram of a detection process of a text classification model according to an embodiment of the present disclosure.

In this embodiment of the present disclosure, when performing feature extraction on medical record texts, the computer device uses the medical record features extracted from the same medical record text as a medical record feature set, and then obtains the medical record feature information by combining multiple medical record feature sets. For example, as shown in FIG. 4, medical record feature information 41 is represented in a form of a matrix. Medical record features in each column are one medical record feature set. The medical record feature sets are sorted according to the generation time of each medical record text. The medical record feature set corresponding to the earliest generated medical record text is ranked in the first column, and the medical record feature set corresponding to the latest generated medical record text is ranked in the last column.

Step 303. Perform prediction on the medical record feature information by using the text classification model to obtain a disease prediction result and result interpretation information.

The text classification model is a deep learning model obtained through training. In this embodiment of the present disclosure, after obtaining the medical record feature information, the computer device performs the prediction on the medical record feature information by using the text classification model, and then obtains the disease prediction result and the result interpretation information outputted by the text classification model. The disease prediction result includes a disease prediction distribution probability for the target object, and the result interpretation information is used for describing impact of each disease feature for the disease prediction result.

In some embodiments, a spatial attention mechanism and a sparse access level attention mechanism are introduced into the text classification model. For example, as shown in FIG. 4, after the medical record feature information 41 is inputted into the text classification model, an embedding vector of a disease feature set corresponding to each medical record text is obtained through a fully-connected layer 42. Then, a feature encoder 43 captures a complex association relationship of inputted disease features, and maps an embedding matrix of the disease feature information of the target object to a hidden state. Then, a spatial attention weight used for measuring importance of a single disease feature is generated according to the spatial attention mechanism 44, and a sparse access level attention weight used for measuring importance of the disease feature set is generated according to the sparse access level attention mechanism 45. Then, the embedding matrix of the disease feature information, the spatial attention weight, and the sparse access level attention weight are inputted into a patient representation module 46 to obtain representation information of the target object, then the representation information is mapped through a linear layer 47 to a logical value, and finally the logical value is converted into a probability value according to a classifier 48 so as to generate a disease prediction result. In addition, in the process of processing the disease feature information 41 by the text classification model, a contribution coefficient corresponding to the disease feature is determined by using the spatial attention weight, the sparse access level attention mechanism, and the embedding vector of the disease feature.

For example, assuming that a feature matrix of the disease feature information is X, an embedding vector E obtained according to a fully-connected layer is shown in formula (1-3):

$$E = W_e X \qquad (1\text{-}3).$$

$W_e$ is a learnable parameter matrix.

After an embedding matrix of the disease feature information is mapped to the hidden state, H is shown in formula (1-4):

$$H = f(E) \qquad (1\text{-}4).$$

$f(\ )$ is any suitable feature encoder based on a neural network, such as a recurrent neural network or a convolutional neural network.

The spatial attention weight $\beta$ is shown in formula (1-5):

$$\beta = \tan h(W_\beta H + b_\beta) \qquad (1\text{-}5).$$

$W_\beta$ and $b_\beta$ are model parameters.

It is determined by using the sparse access level attention mechanism that the sparse access level attention weight $\alpha$ can be obtained through formula (1-6):

$$\alpha = (\text{soft max}(\delta) + \text{sparse max}(\delta))/2 \qquad (1\text{-}6).$$

$\delta = W_\delta H + b_\delta$, and $W_\delta$, and $b_\delta$ are model parameters.

The patient representation $E_r$ obtained by the patient representation module is shown in formula (1-7):

$$E_r = \alpha(\beta \odot E)^T \qquad (1\text{-}7).$$

The logical value $\tilde{y}$ obtained through mapping by a linear layer is shown in formula (1-8):

$$\tilde{y} = W_c E_r + b_c \qquad (1\text{-}8).$$

$W_c$ and $b_c$ are model parameters.

The probability value y* obtained by converting the logical value $\tilde{y}$ through a classifier is shown in formula (1-9):

$$y^* = \text{soft max}(\tilde{y}) \qquad (1\text{-}9).$$

The contribution coefficient CM [t, m] obtained in a $t^{th}$ detection for an $m^{th}$ disease feature is shown in formula (1-10):

$$CM[t,m] = W_c^T(\alpha[t]\beta[:,t] \odot W_e[:,m]) \qquad (1\text{-}10).$$

$\alpha[t]$ refers to the sparse access level attention weight of the $m^{th}$ disease feature obtained for the $t^{th}$ detection of the disease feature information, and $\beta[:,t]$ refers to the spatial attention weight of the $m^{th}$ disease feature obtained for the $t^{th}$ detection of the disease feature information. $W_e[:, m]$ refers to the embedding vector of the $m^{th}$ disease feature.

Some of the foregoing content is an introduction to a single detection of the text classification model. In actual application, the text classification model detects the same disease feature information for multiple times by using different model parameters, and then performs the averaging on results obtained from multiple detections to obtain a final disease prediction result and final result interpretation information.

Step 304. Display the disease prediction result and the result interpretation information in a user interface.

In this embodiment of the present disclosure, after obtaining the disease prediction result and the result interpretation information through the text classification model, the computer device displays the disease prediction result and the result interpretation information in the user interface. The result interpretation information and the disease prediction result may be displayed in the same interface, or may be displayed in different interfaces. This is not limited in the embodiments of the present disclosure.

Figure 5:
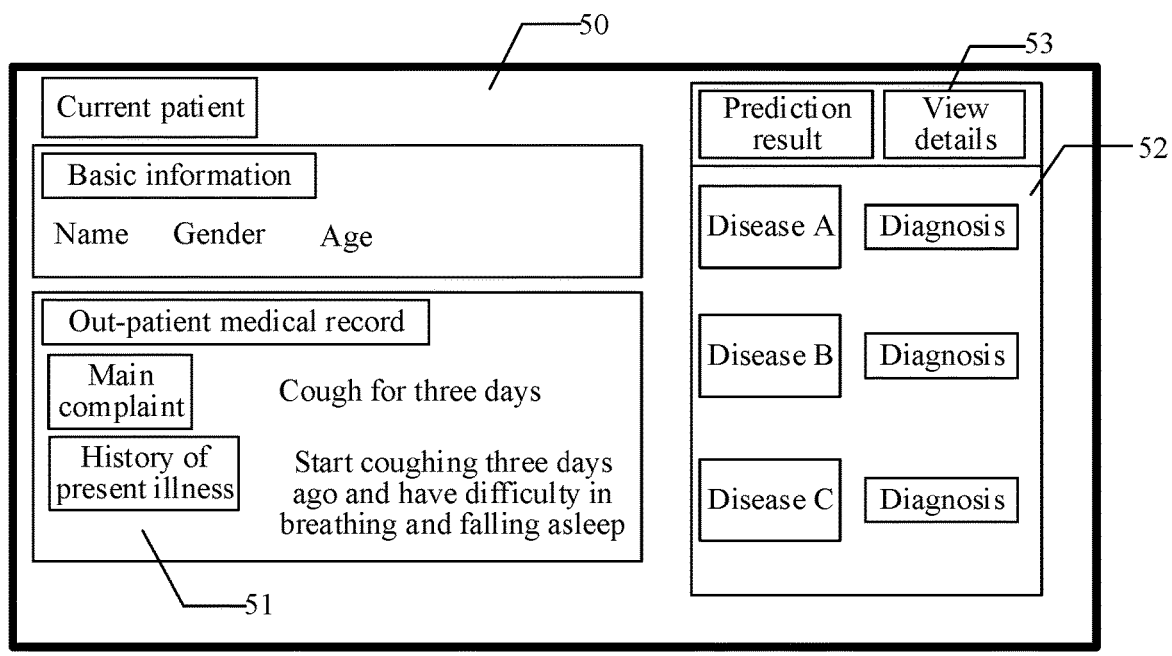
FIG. 5 is a schematic diagram of a user interface according to an embodiment of the present disclosure.

For example, as shown in FIG. 5, the user interface 50 includes a current disease description text 51 of the target object and a disease prediction result 52 obtained through the text classification model. In some embodiments, after the user clicks a control 53, the result interpretation information is displayed in the user interface.

The following are apparatus embodiments of the present disclosure, which can be used to perform the method embodiments of the present disclosure. For details not disclosed in the apparatus embodiments of the present disclosure, refer to the method embodiments of the present disclosure.

Figure 6:
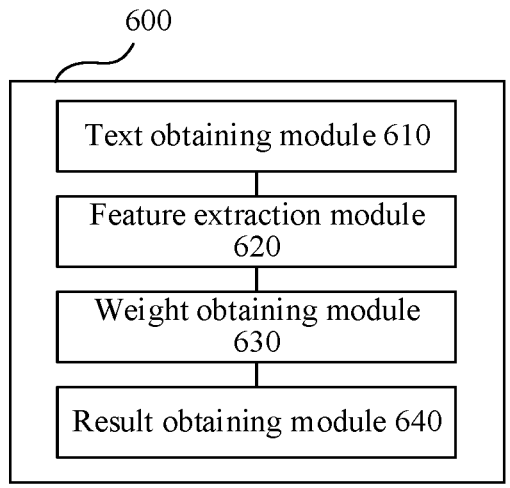
FIG. 6 is a block diagram of a text classification apparatus according to an embodiment of the present disclosure.

FIG. 6 is a block diagram of a text classification apparatus according to an embodiment of the present disclosure. The apparatus has functions of implementing the foregoing text classification method. The functions may be implemented by hardware, or may be implemented by hardware executing corresponding software. The apparatus may be a computer device or may be disposed in a computer device. The apparatus 600 may include:

a text obtaining module 610, configured to obtain a target text and an associated text corresponding to the target text; a feature extraction module 620, configured to perform feature extraction on the target text and the associated text to obtain feature information, the feature information including at least one feature; a weight obtaining module 630, configured to process the feature information by using an attention mechanism to obtain an attention weight respectively corresponding to each feature, the attention weight indicating importance of the feature for the target text and the associated text; and a result acquisition module 640, configured to obtain a class detection result and result interpretation information corresponding to the target text based on the feature information and the attention weight, the class detection result including a class distribution probability corresponding to the target text, and the result interpretation information describing impact of each feature for the class detection result.

In some embodiments, the result obtaining module 640 is configured to obtain a spatial attention weight and a sparse access level attention weight corresponding to the feature, where the spatial attention weight indicates importance of the single feature, the sparse access level attention weight indicates importance of a feature set in which the feature is located, and the feature set includes features from the same text; determine a final attention weight corresponding to the feature according to the spatial attention weight and the sparse access level attention weight; determine a contribution coefficient corresponding to the feature based on the final attention weight and an embedding vector corresponding to the feature; and determine the contribution coefficient respectively corresponding to each feature as result interpretation information corresponding to the target text.

In some embodiments, the weight obtaining module 630 is configured to process each feature in the feature information by using a spatial attention mechanism to obtain a spatial attention weight respectively corresponding to each feature; combine and divide the features from the same text based on sources of each feature to obtain multiple groups of feature sets, where different feature sets include features from different texts; and process the multiple groups of feature sets by using a sparse access level attention mechanism to obtain a sparse access level attention weight respectively corresponding to each feature set.

In some embodiments, the class detection result is obtained by performing prediction on the feature information by using a text classification model, where the text classification model processes the feature information for multiple times by using different model parameters, the class detection result includes n groups of class detection sub-results, the result interpretation information includes n pieces of result interpretation sub-information corresponding to the n groups of class detection sub-results, the class detection sub-results and the result interpretation sub-information are in a one-to-one correspondence, and n is a positive integer.

Figure 7:
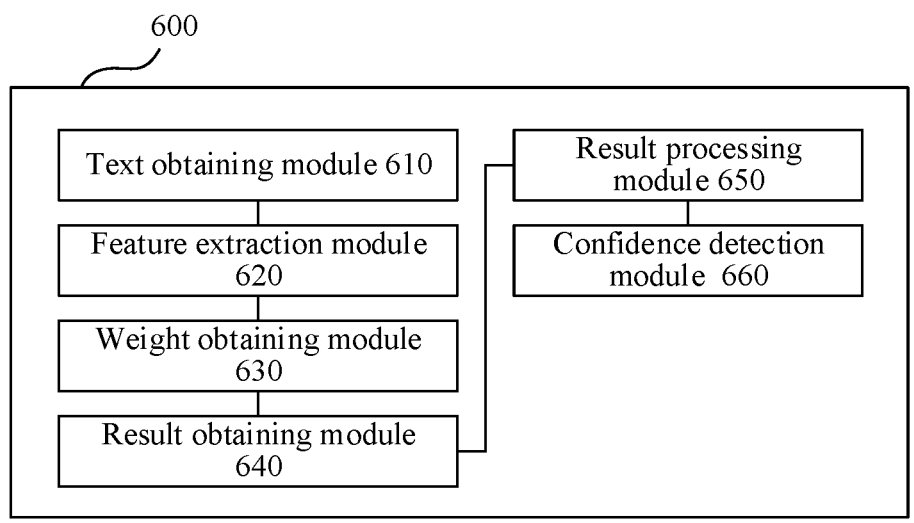
FIG. 7 is a block diagram of another text classification apparatus according to an embodiment of the present disclosure.

In some embodiments, as shown in FIG. 7, the apparatus 600 further includes: a result processing module 650, configured to separately obtain probability values corresponding to a target class from the n groups of class detection sub-results; perform averaging on the probability values of the target class to obtain a final probability value corresponding to the target class; and generate a final class detection result corresponding to the target text, where the final class detection result includes a final probability value respectively corresponding to each class.

In some embodiments, as shown in FIG. 7, the apparatus 600 further includes: a confidence detection module 660, configured to obtain a measurement parameter of the final class detection result based on the final probability value respectively corresponding to each class, where the measurement parameter is used for measuring confusion of the final class detection result; determine confidence of the text classification model for the target text according to the measurement parameter; determine the final class detection result as an accurate detection result in response to the confidence meeting a condition; and generate prompt information in response to the confidence not meeting the condition, where the prompt information is used for reminding to perform manual analysis on the target text.

In some embodiments, the different model parameters are obtained according to multiple random sampling.

In summary, according to the technical solution provided in this embodiment of the present disclosure, the feature information is processed through the attention mechanism to determine the attention weight used for indicating the importance of each feature for the text, and the class detection result and the result interpretation information are obtained according to the feature information and the attention weight. On one hand, the class detection result includes the class distribution probability, so that the class detection result has diversity, thereby avoiding the output of only one class. On the other hand, the result interpretation information is used for describing the impact on each feature for the class detection result, which makes the class detection result explainable, thereby improving the reliability of the class detection result. The user can determine the basis for obtaining the class detection result based on the result interpretation information, so that the user can more intuitively understand the class detection result.

Figure 8:
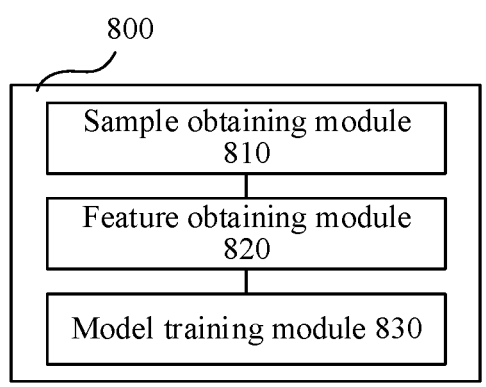
FIG. 8 is a block diagram of a text classification model training apparatus according to an embodiment of the present disclosure.

FIG. 8 is a block diagram of a text classification model training apparatus according to an embodiment of the present disclosure. The apparatus has functions of implementing the foregoing training method of a text classification model. The functions may be implemented by hardware, or may be implemented by hardware executing corresponding software. The apparatus may be a computer device or may be disposed in a computer device. The apparatus 800 may include:

a sample obtaining module 810, configured to obtain multiple sample texts and class information corresponding to the sample texts; a feature obtaining module 820, configured to separately extract sample feature information from the sample texts; a model training module 830, configured to train the text classification model by using the sample feature information and the class information, an attention mechanism being introduced into the text classification model, the attention mechanism being used for determining importance of sample features in the sample feature information for the sample texts, and the importance being used for determining impact of the sample features on a model output result.

In some embodiments, the model training module 830 is configured to process the sample feature information for multiple times by using multiple groups of model parameters to obtain multiple groups of model output results; determines a loss function value of the text classification model based on the multiple groups of model output results and the class information, where a loss function indicates accuracy of an output result of the text classification model; and adjust a parameter of the text classification model based on the loss function value until the loss function converges.

In some embodiments, the attention mechanism includes a spatial attention mechanism and a sparse access level attention mechanism, where the spatial attention mechanism is used for measuring importance of the single feature, the sparse access level attention mechanism is used for measuring importance of a feature set, and the feature set includes features from the same text.

In summary, according to the technical solution provided in this embodiment of the present disclosure, the text classification model is obtained by training through the sample feature information and the class information, and the attention mechanism is introduced into the text classification model. In the model application process, the feature information is processed by using the attention mechanism to determine the attention weight used for indicating the importance of each feature for the text, so that while outputting the result, the model can output a basis for obtaining the result, so that the user can more intuitively understand the model output result.

The term module (and other similar terms such as submodule, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

When the apparatus provided in the foregoing embodiment implements the functions of the apparatus, only division of the foregoing function modules is described by using an example. During actual application, the foregoing functions may be allocated to and completed by different function modules according to requirements. That is, an internal structure of the device is divided into different function modules, to complete all or some of the foregoing functions described. In addition, the apparatus and method embodiments provided in the foregoing embodiments belong to the same conception. For the specific implementation process, reference may be made to the method embodiments.

Figure 9:
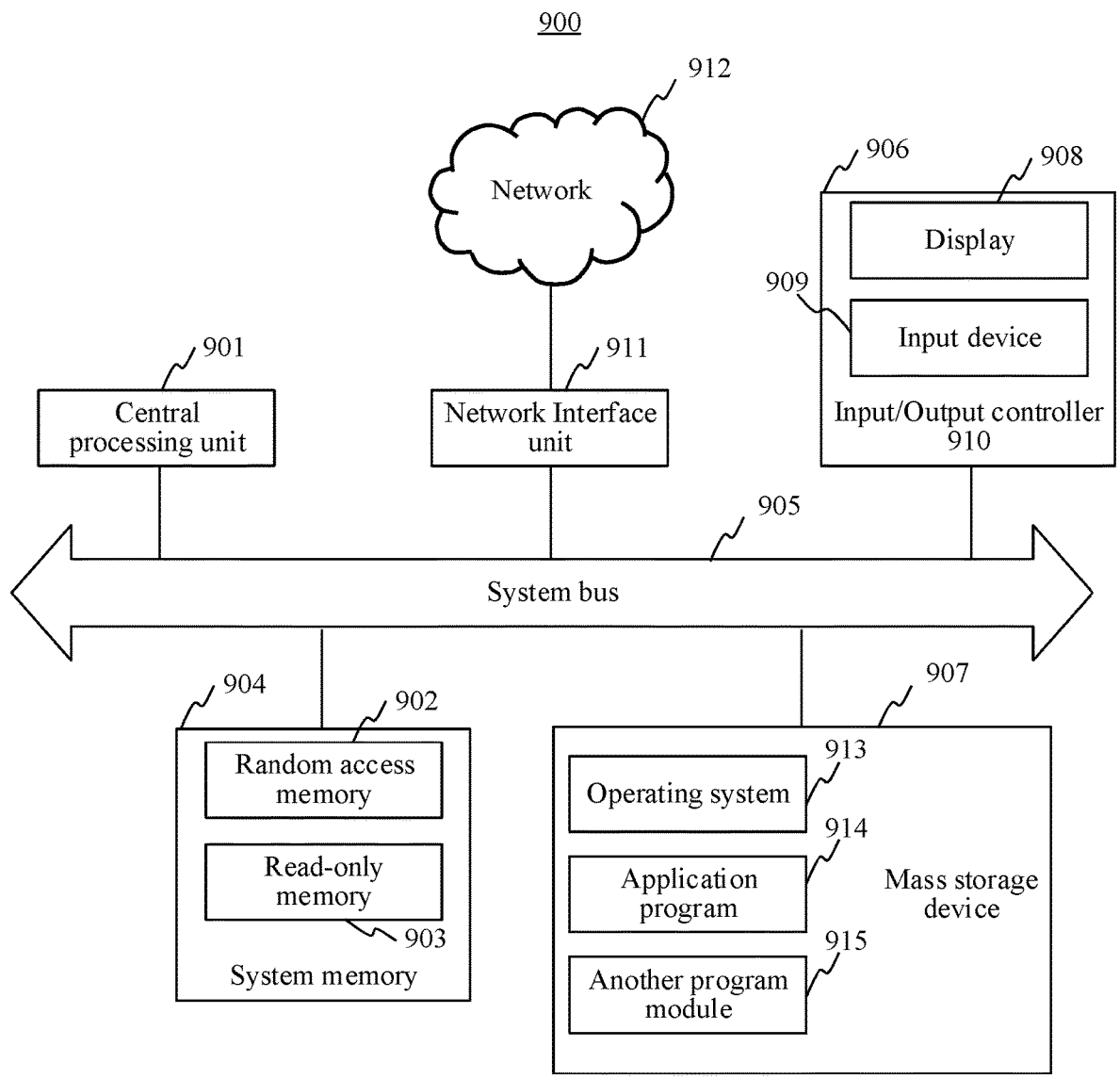
FIG. 9 is a structural block diagram of a computer device according to an embodiment of the present disclosure.

FIG. 9 is a structural block diagram of a computer device according to an embodiment of the present disclosure. The computer device may be configured to implement functions of the foregoing text classification method or text classification model training method. As shown in FIG. 9, the computer device 900 includes a central processing unit (CPU) 901, a system memory 904 including a random access memory (RAM) 902 and a read memory (ROM) 903, and a system bus 905 connecting the system memory 904 to the CPU 901. The computer device 900 further includes a basic input/output (I/O) system 906 assisting in transmitting information between components in a computer, and a mass storage device 907 configured to store an operating system 913, an application program 914, and another program module 915.

The basic I/O system 906 includes a display 908 and an input device 909. The display 908 and the input device 909 are both connected to the CPU 901 by using an input/output controller 910 that is connected to the system bus 905.

The mass storage device 907 is connected to the CPU 901 by using a mass storage controller (not shown) connected to the system bus 905. The mass storage device 907 and a computer-readable medium associated with the large-capacity storage device provide non-volatile storage to the computer device 900.

Generally, the computer-readable medium may include a computer storage medium and a communication medium. The computer storage medium includes volatile and non-volatile, removable and non-removable media that are configured to store information such as computer-readable instructions, data structures, program modules, or other data and that are implemented by using any method or technology. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device. Certainly, a person skilled in the art may know that the computer storage medium is not limited to the foregoing several types. The foregoing system memory 904 and mass storage device 907 may be collectively referred to as a memory.

In some embodiments, the computer device 900 may further be connected, through a network such as the Internet, to a remote computer on the network. That is, the computer device 900 may be connected to a network 912 by using a network interface unit 911 connected to the system bus 905, or may be connected to another type of network or a remote computer system (not shown) by using a network interface unit 911.

The memory further includes a computer program. The computer program is stored in the memory and configured to be executed by one or more processors to implement the foregoing text classification method or the foregoing text classification model training method.

An embodiment of the present disclosure further provides a computer-readable storage medium, storing at least one instruction, at least one program, a code set, or an instruction set, the at least one instruction, the at least one program, the code set, or the instruction set, when executed by a processor, implementing the foregoing text classification method, or implementing the foregoing text classification model training method.

In some embodiments, the computer-readable storage medium may include: a read-only memory (ROM), a RAM, a solid state drive (SSD), an optical disc, or the like. The RAM may include a resistance random access memory (ReRAM) and a dynamic random access memory (DRAM).

An embodiment of the present disclosure provides a computer program product or a computer program, including computer instructions, the computer instructions being stored in a computer-readable storage medium. A processor of a computer device reads the computer instructions from the computer-readable storage medium, and executes the computer instructions, to cause the computer device to perform the foregoing text classification method, or the foregoing text classification model training method.

It is to be understood that "multiple" mentioned in the specification means two or more. "And/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects. In addition, the step numbers described in this specification merely schematically show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of the present disclosure.

The foregoing descriptions are merely exemplary embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A text classification method, comprising:
obtaining a target text and an associated text corresponding to the target text;
performing feature extraction on the target text and the associated text to obtain feature information, the feature information comprising one or more features;
processing the feature information by using an attention mechanism to obtain one or more attention weights respectively corresponding to the one or more features, an attention weight indicating importance of the corresponding feature for the target text and the associated text; and
obtaining, by performing prediction on the feature information by using a text classification model, a class detection result and result interpretation information corresponding to the target text based on the feature information and the one or more attention weights, the class detection result comprising a class distribution probability corresponding to the target text, and the result interpretation information describing impact of the one or more features on the class detection result,
wherein the text classification model processes the feature information for multiple times by using different model parameters to obtain the class detection result, the class detection result comprises n groups of class detection sub-results, the result interpretation information comprises n pieces of result interpretation sub-information corresponding to the n groups of class detection sub-results, the class detection sub-results and the result interpretation sub-information are in a one-to-one correspondence, and n is a positive integer; and
the method further comprises:
generating a final class detection result corresponding to the target text, wherein the final class detection result comprises a final probability value respectively corresponding to each class;
determining confidence of the text classification model for the target text according to the final probability value respectively corresponding to each class;
determining the final class detection result as an accurate detection result in response to the confidence meeting a condition; and
generating prompt information in response to the confidence not meeting the condition, wherein the prompt information is used for reminding to perform manual analysis on the target text.

2. The method according to claim 1, wherein the obtaining result interpretation information corresponding to the target text based on the feature information and the one or more attention weights comprises:
for one feature in the feature information,
determining a spatial attention weight and a sparse access level attention weight corresponding to the feature, wherein the spatial attention weight indicates importance of the single feature, the sparse access level attention weight indicates importance of a feature set in which the feature is located, and the feature set comprises features from the same text;
determining a final attention weight corresponding to the feature according to the spatial attention weight and the sparse access level attention weight; and
determining a contribution coefficient corresponding to the feature based on the final attention weight and an embedding vector corresponding to the feature; and
determining one or more contribution coefficients respectively corresponding to the one or more features as the result interpretation information corresponding to the target text.

3. The method according to claim 1, wherein the processing the feature information by using an attention mechanism to obtain one or more attention weights respectively corresponding to the one or more features comprises:
processing the one or more features in the feature information by using a spatial attention mechanism to obtain one or more spatial attention weights respectively corresponding to the one or more features e;
combining and dividing features from the same text based on sources of the one or more features to obtain multiple groups of feature sets, wherein different feature sets comprise features from different texts; and
processing the multiple groups of feature sets by using a sparse access level attention mechanism to obtain sparse access level attention weights respectively corresponding to the multiple groups of feature sets.

4. The method according to claim 1, wherein generating the final class detection result comprises:
separately obtaining probability values corresponding to a target class from the n groups of class detection sub-results, wherein the target class is a class in a detection result for the target text;
performing averaging on the probability values of the target class to obtain a final probability value corresponding to the target class; and
generating the final class detection result corresponding to the target text based on the final probability value respectively corresponding to each class.

5. The method according to claim 1, wherein determining the confidence of the text classification model comprises:
obtaining a measurement parameter of the final class detection result based on the final probability value respectively corresponding to each class, wherein the measurement parameter is used for measuring confusion of the final class detection result;
determining the confidence of the text classification model for the target text according to the measurement parameter.

6. The method according to claim 1, wherein the method further comprises:
separately obtaining contribution coefficients corresponding to a target feature from the n pieces of result interpretation sub-information, wherein the target feature is any feature in the feature information;
performing averaging on the contribution coefficients corresponding to the target feature to obtain a final contribution coefficient corresponding to the target feature; and
generating a final result interpretation information corresponding to the target text, wherein the final result interpretation information comprises one or more final contribution coefficients respectively corresponding to the one or more features.

7. The method according to claim 1, wherein the different model parameters are obtained according to multiple random sampling.

8. The method according to claim 1, wherein the text classification model is obtained by:
obtaining multiple sample texts and class information corresponding to the sample texts;
separately extracting sample feature information from the sample texts; and training the text classification model by using the sample feature information and the class information, the attention mechanism being introduced into the text classification model, the attention mechanism being used for determining importance of sample features in the sample feature information for the sample texts, and the importance being used for determining impact of the sample features on a model output result.

9. The method according to claim 8, wherein the training the text classification model by using the sample feature information and the class information comprises:

processing the sample feature information for multiple times by using multiple groups of model parameters to obtain multiple groups of model output results;

determining a loss function value of the text classification model based on the multiple groups of model output results and the class information, wherein a loss function indicates accuracy of an output result of the text classification model; and adjusting a parameter of the text classification model based on the loss function value until the loss function converges.

10. The method according to claim 8, wherein the attention mechanism comprises a spatial attention mechanism and a sparse access level attention mechanism, wherein the spatial attention mechanism is used for measuring importance of a single feature, the sparse access level attention mechanism is used for measuring importance of a feature set, and the feature set comprises features from the same text.

11. A text classification apparatus, comprising:

a processor and a memory, the memory storing at least one instruction, at least one program, a code set, or an instruction set, the at least one instruction, the at least one program, the code set, or the instruction set being loaded and executed by the processor to implement:

obtaining a target text and an associated text corresponding to the target text;

performing feature extraction on the target text and the associated text to obtain feature information, the feature information comprising one or more features;

processing the feature information by using an attention mechanism to obtain one or more attention weights respectively corresponding to the one or more features, an attention weight indicating importance of the corresponding feature for the target text and the associated text; and obtaining a class detection result and result interpretation information corresponding to the target text based on the feature information and the one or more attention weights, the class detection result comprising a class distribution probability corresponding to the target text, and the result interpretation information describing impact of the one or more features on the class detection result, wherein the text classification model processes the feature information for multiple times by using different model parameters to obtain the class detection result, the class detection result comprises n groups of class detection sub-results, the result interpretation information comprises n pieces of result interpretation sub-information corresponding to the n groups of class detection sub-results, the class detection sub-results and the result interpretation sub-information are in a one-to-one correspondence, and n is a positive integer; and the processor is further configured to implement:

generating a final class detection result corresponding to the target text, wherein the final class detection result comprises a final probability value respectively corresponding to each class;

determining confidence of the text classification model for the target text according to the final probability value respectively corresponding to each class;

determining the final class detection result as an accurate detection result in response to the confidence meeting a condition; and generating prompt information in response to the confidence not meeting the condition, wherein the prompt information is used for reminding to perform manual analysis on the target text.

12. The apparatus according to claim 11, wherein the obtaining result interpretation information corresponding to the target text based on the feature information and the one or more attention weights comprises:

for one feature in the feature information, determining a spatial attention weight and a sparse access level attention weight corresponding to the feature, wherein the spatial attention weight indicates importance of the single feature, the sparse access level attention weight indicates importance of a feature set in which the feature is located, and the feature set comprises features from the same text;

determining a final attention weight corresponding to the feature according to the spatial attention weight and the sparse access level attention weight; and determining a contribution coefficient corresponding to the feature based on the final attention weight and an embedding vector corresponding to the feature; and determining one or more contribution coefficients respectively corresponding to the one or more features as the result interpretation information corresponding to the target text.

13. The apparatus according to claim 11, wherein the processing the feature information by using an attention mechanism to obtain one or more attention weights respectively corresponding to the one or more features comprises:

processing the one or more features in the feature information by using a spatial attention mechanism to obtain one or more spatial attention weights respectively corresponding to the one or more features e;

combining and dividing features from the same text based on sources of the one or more features to obtain multiple groups of feature sets, wherein different feature sets comprise features from different texts; and processing the multiple groups of feature sets by using a sparse access level attention mechanism to obtain sparse access level attention weights respectively corresponding to the multiple groups of feature sets.

14. The apparatus according to claim 11, wherein generating the final class detection result comprises:

separately obtaining probability values corresponding to a target class from the n groups of class detection sub-results, wherein the target class is a class in a detection result for the target text;

performing averaging on the probability values of the target class to obtain a final probability value corresponding to the target class; and generating the final class detection result corresponding to the target text based on the final probability value respectively corresponding to each class.

15. The apparatus according to claim 11, wherein determining the confidence of the text classification model comprises:

obtaining a measurement parameter of the final class detection result based on the final probability value respectively corresponding to each class, wherein the measurement parameter is used for measuring confusion of the final class detection result;

determining the confidence of the text classification model for the target text according to the measurement parameter.

16. The apparatus according to claim 11, wherein the processor is further configured to perform:

separately obtaining contribution coefficients corresponding to a target feature from the n pieces of result interpretation sub-information, wherein the target feature is any feature in the feature information;

performing averaging on the contribution coefficients corresponding to the target feature to obtain a final contribution coefficient corresponding to the target feature; and generating a final result interpretation information corresponding to the target text, wherein the final result interpretation information comprises one or more final contribution coefficients respectively corresponding to the one or more features.

17. The apparatus according to claim 11, wherein the different model parameters are obtained according to multiple random sampling.

18. A non-transitory computer-readable storage medium, storing at least one instruction, at least one program, a code set, or an instruction set, the at least one instruction, the at least one program, the code set, or the instruction set being loaded and executed by a processor to implement:

obtaining a target text and an associated text corresponding to the target text;

performing feature extraction on the target text and the associated text to obtain feature information, the feature information comprising one or more features;

processing the feature information by using an attention mechanism to obtain one or more attention weights respectively corresponding to the one or more features, an attention weight indicating importance of the corresponding feature for the target text and the associated text; and obtaining a class detection result and result interpretation information corresponding to the target text based on the feature information and the one or more attention weights, the class detection result comprising a class distribution probability corresponding to the target text, and the result interpretation information describing impact of the one or more features on the class detection result wherein the text classification model processes the feature information for multiple times by using different model parameters to obtain the class detection result, the class detection result comprises n groups of class detection sub-results, the result interpretation information comprises n pieces of result interpretation sub-information corresponding to the n groups of class detection sub-results, the class detection sub-results and the result interpretation sub-information are in a one-to-one correspondence, and n is a positive integer; and the processor is further configured to implement:

generating a final class detection result corresponding to the target text, wherein the final class detection result comprises a final probability value respectively corresponding to each class;

determining confidence of the text classification model for the target text according to the final probability value respectively corresponding to each class;

determining the final class detection result as an accurate detection result in response to the confidence meeting a condition; and generating prompt information in response to the confidence not meeting the condition, wherein the prompt information is used for reminding to perform manual analysis on the target text.

* * * * *